(12) United States Patent
Al-Zaydi et al.

(10) Patent No.: US 11,192,902 B1
(45) Date of Patent: Dec. 7, 2021

(54) HETEROCYCLIC DIAZENYL PYRIDINONE COPPER(II) COMPLEXES AS PHARMACOLOGICAL ANTITUMOR AGENTS

(71) Applicant: King Abdulaziz University, Jeddah (SA)

(72) Inventors: Khadijah Mohamed Khalf Al-Zaydi, Jeddah (SA); Ahlam Ibrahim Difullah Al-Sulami, Jeddah (SA); Maram Talal J Basha, Jeddah (SA)

(73) Assignee: KING ABDULAZIZ UNIVERSITY, Jeddah (SA)

( * ) Notice: Subject to any disclaimer, the term of this patent is extended or adjusted under 35 U.S.C. 154(b) by 0 days.

(21) Appl. No.: 17/022,638

(22) Filed: Sep. 16, 2020

(51) Int. Cl.
*C07F 1/00* (2006.01)

(52) U.S. Cl.
CPC .................................. *C07F 1/005* (2013.01)

(58) Field of Classification Search
CPC ......................................................... C01F 1/08
See application file for complete search history.

*Primary Examiner* — Heidi Reese
(74) *Attorney, Agent, or Firm* — W&C IP

(57) ABSTRACT

Heterocyclic diazenyl pyridinone copper(II)-based complexes are provided as pharmacological antitumor agents e.g. to treat breast cancer.

5 Claims, 6 Drawing Sheets

Figure 4A
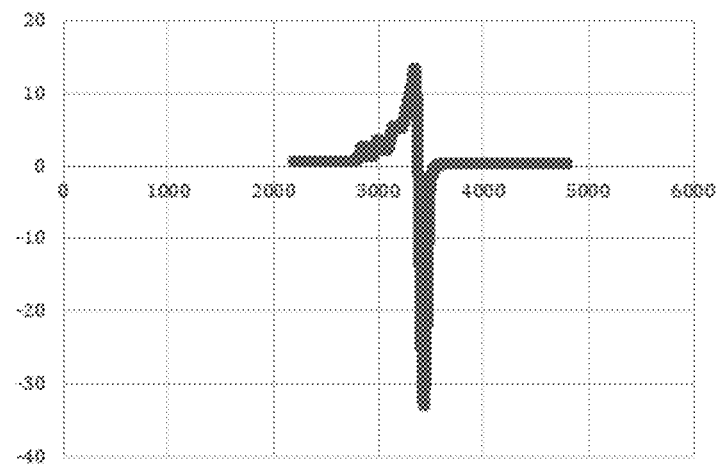
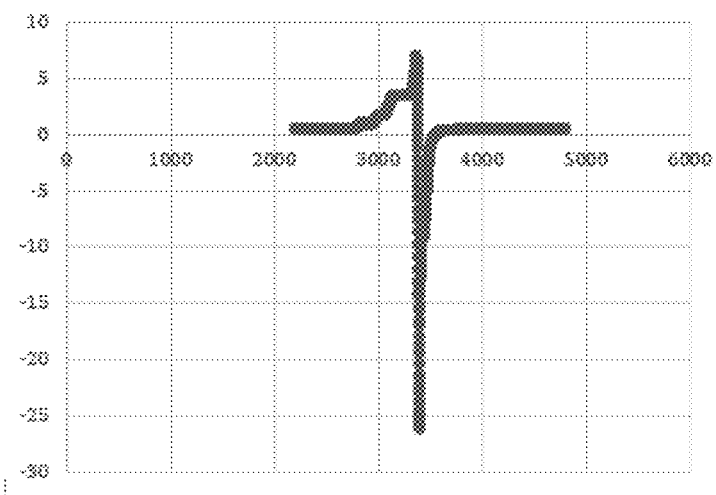
Figure 4B

HETEROCYCLIC DIAZENYL PYRIDINONE COPPER(II) COMPLEXES AS PHARMACOLOGICAL ANTITUMOR AGENTS

BACKGROUND OF THE INVENTION

Field of the Invention

The invention generally relates to anticancer agents. In particular, heterocyclic diazenyl pyridinone copper(II)-based complexes are provided as pharmacological antitumor agents e.g. to treat breast cancer.

Description of Related Art

Breast cancer is the second most prevalent cancer in women [8], and the subsequent number of survivors is expected to grow over the next two decades [9]. Therefore, intensive research efforts all over the world to explore new potential metal-based anticancer drugs with low side effects, including nephrotoxicity, ototoxicity, electrolyte disturbance, and drug resistance [6,7]. For example, in recent years, Schiff-base metal complexes as anticancer agents have rapidly grown, as illustrated by the increasing number of publications reported since 2000 (see FIG. 1).

The key factor for the synthesis of drugs used as a pharmacological treatment is cytotoxic cell-killing [10]. On the other hand, a major challenge is to design new drugs with high selectivity and lower side effects including, toxicity, destruction of non-tumor cells, etc. to reduce morbidity and mortality.

The undesirable side effects of the therapeutic platinum-metal complexes, which are used worldwide, have stimulated an extensive search for novel antitumor-active complexes. Nephrotoxicity, emetogenesis, and neurotoxicity are examples of some side effects that occur with the use of cisplatin, carboplatin, and oxaliplatin, each of which is approved by the Food and Drug Administration (FDA) [11,12]. Recently, copper-metal complexes with a change of valence electron during the redox reactions are introducing alternative anticancer agents with promising pharmacological properties.

The copper (II) complex is an essential cellular nutrient in all higher plants and animals for many biological pathways. Copper ions participate during oxidation and reduction reactions to catalyze the formation of OH, which results in the oxidative damage of cells [13]. Then, it can competitively bind to a site that could otherwise be occupied by other metals, or can interact with DNA, as has shown with the copper-metal complex of $[Cu(C_{20}H_{22}NO_3)_2] \cdot H_2O$ [14].

Heterocyclic moieties with highly dense electrons coordinated at the centers of metal-based complexes have received considerable attention as pharmacological agents, and have been used antibacterial, antifungal and antiviral agents [1,4]. Novel Cu, Zn, and Cd transition metals as coordination complexes, forming a type of 4N+2O neutrality complex, inhibit cellular proliferation and have anticancer action on breast cancer cells (MDA-MB-231). Remarkably, the inhibitory activity is three times higher than that of the widely used drug cisplatin with respect to human breast cancer (see FIG. 2) [18].

The complexes presented in FIG. 2 show excellent inhibitory activity against human lung carcinoma cells line as well. Moreover, because of the effect of the highly reactive oxygen species ROS of Cu(II) heterocyclic hydrazone complexes, they display more efficient activity than the Ni(II), and Co(II) complexes shown in FIG. 3.

Thus, although some metal-based complexes with different modes of action have been suggested as cytotoxic agents, most of them suffer from drawbacks, including causing many side effects, such as gastrointestinal toxicity and hematologic and bone marrow disorders. In addition, they have very short half-lives in the body. Therefore, new drug candidates with a low $IC_{50}$ and fewer side effects are needed.

SUMMARY OF THE INVENTION

Provided herein are heterocyclic diazenyl pyridinone copper(II)-based complexes for use as pharmacological antitumor agents. The compounds exhibit excellent anti-cancer chemotherapeutic activity e.g. against breast cancer cells. Without being bound by theory, it is believed that these agents activate the cell death pathway in tumor cells.

Other features and advantages of the present invention will be set forth in the description of invention that follows, and in part will be apparent from the description or may be learned by practice of the invention. The invention will be realized and attained by the compositions and methods particularly pointed out in the written description and claims hereof.

It is an object of this invention to provide a compound of Formula I:

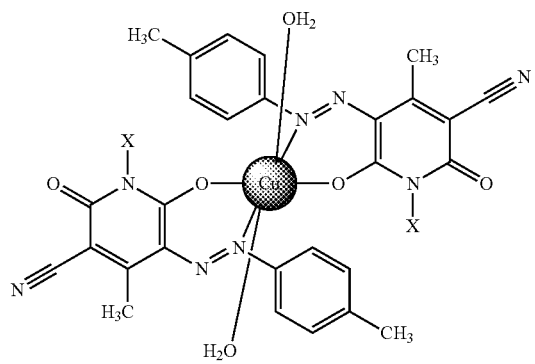

Formula I where X=a C1 to C20 hydrocarbon which is optionally substituted. In some aspects, X=butyl, hexyl or benzyl.

Also provided is a composition comprising a compound of Formula I:

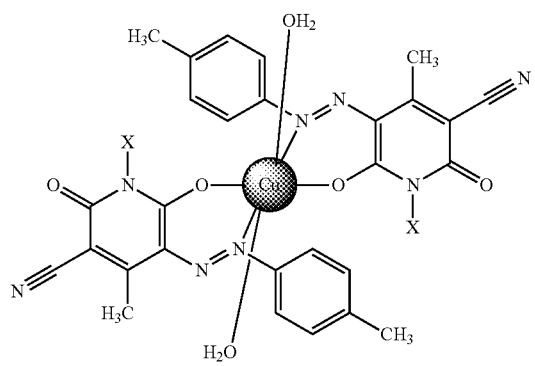

Formula I where X=a C1 to C20 hydrocarbon which is optionally substituted, and a pharmaceutically acceptable carrier. In some aspects, X=butyl, hexyl or benzyl.

Also provided is a method of killing cancer cells, comprising contacting the cancer cells with a compound of Formula I:

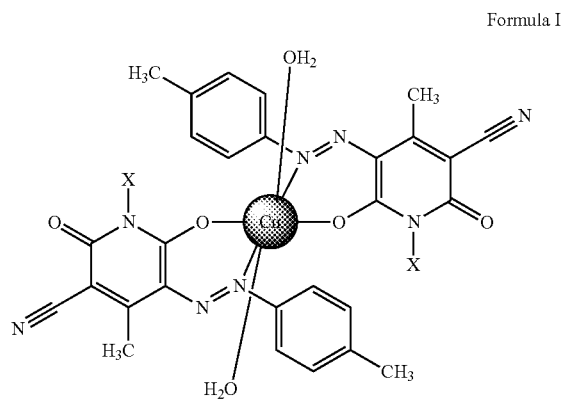

Formula I where X=a C1 to C20 hydrocarbon which is optionally substituted. In some aspects, X=butyl, hexyl or benzyl. In additional aspects, the cancer cells are breast cancer cells.

Also provided is a method of treating cancer in a subject in need thereof, comprising administering to the subject a compound of Formula I:

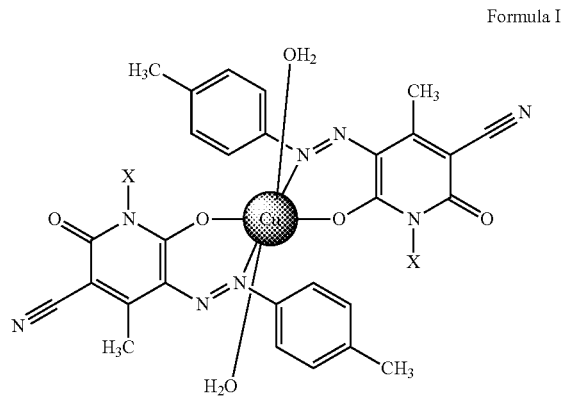

Formula I where X=a C1 to C20 hydrocarbon which is optionally substituted. In some aspects, X=butyl, hexyl or benzyl. In additional aspects, the cancer is breast cancer.

BRIEF DESCRIPTION OF THE DRAWINGS

FIG. 4A-C. EPR spectra of the complexes. A, D2; B, D4; C, D5.

DETAILED DESCRIPTION

Figure 1:
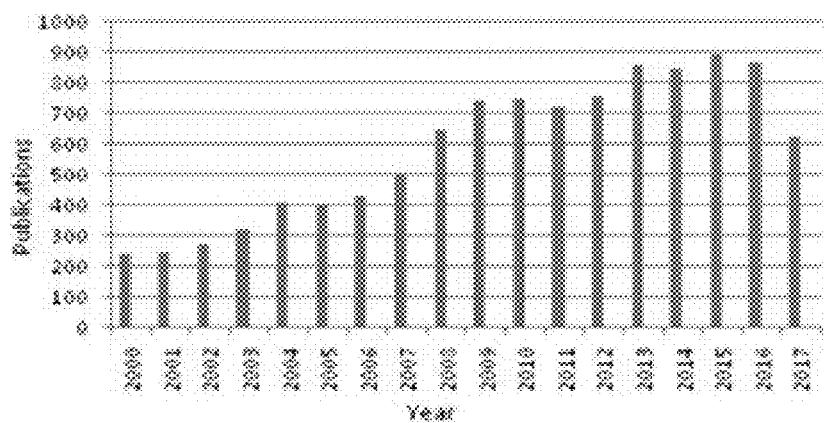
FIG. 1. Increasing number of publications based on the Schiff-based metal complexes as anticancer agents.
Figure 2:
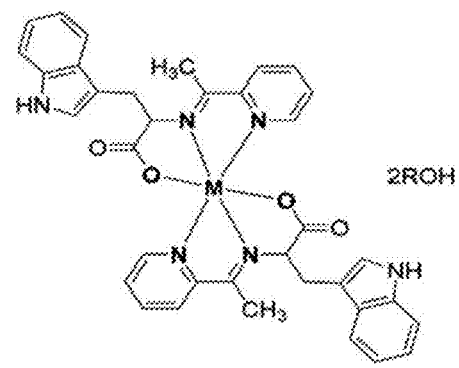
FIG. 2. Structure of metal-based complexes (M=Cu, Zn, Cd) having potent anti-breast cancer activity.
Figure 3:
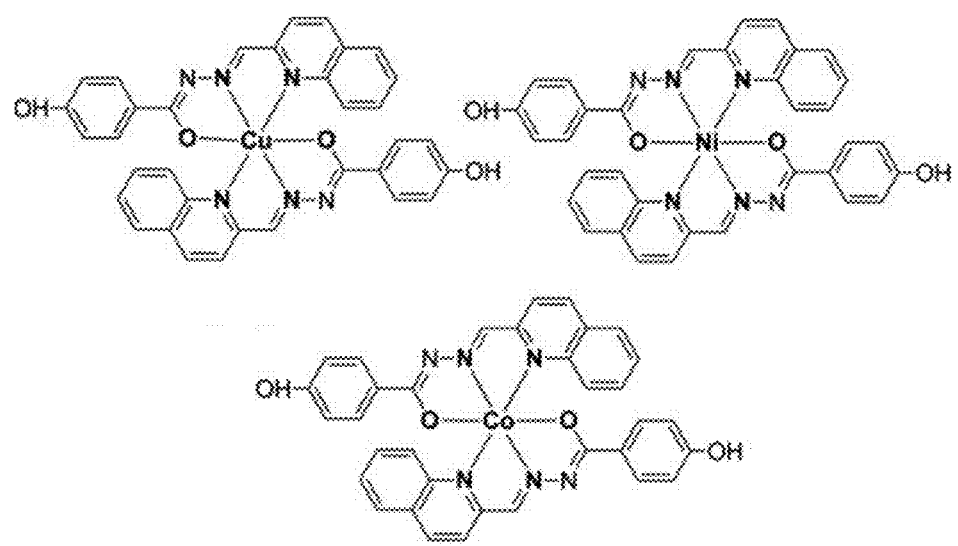
FIG. 3. Structure of Co(II), Ni(II), and Cu(II) metal complex structures.

Heterocyclic diazenyl derivatives have gained interest due to their potential therapeutic effects as antineoplastic, antiviral, antidiabetic, antiseptic, antifungal, and antimicrobial agents [19-21]. Accordingly, it is desirable to identify ways to stabilize compounds while maintaining acceptable therapeutic activity levels. In particular, the addition of functional groups to stabilize such compounds and maintain an acceptable therapeutic activity level is crucial. Diazenyl Schiff base and thiosemicarbazones and their metal complexes are used in many applications, ranging from pharmacology to nuclear medicine [15-17]. The effect of chelating thiosemicarbazones on growth inhibition of MCF-7 and MDA-MB-231 (breast adenocarcinoma) as well as HCT 116 and HT-29 (colorectal carcinoma) cell lines has been reported [15]. However, replacing the diazenyl pyridinone heterocyclic derivatives with various electron acceptor and donor groups loaded onto the copper-metal complex centers permitted evaluation of the effect of the substituted benzyl groups attached on both sides of diazenyl as nitrophenyl as antitumor agents.

Based on the unmet need in the art, new heterocyclic diazinyl pyridinone derivatives are provided. The derivatives are copper(II)-based complexes comprising methyl electron donating groups and a variety of alkyl and/or aryl functional groups. The new complexes exhibit high activity against e.g. breast cancer cells, and thus show great promise as antitumor agents. The present disclosure describes the synthesis and analyses of these improved diazenyl pyridinone derivatives. The resultant complexes have excellent activity as antitumor agents, e.g. against MCF-7 human breast adenocarcinoma cells.

A generic structure of the complexes is shown in Formula I:

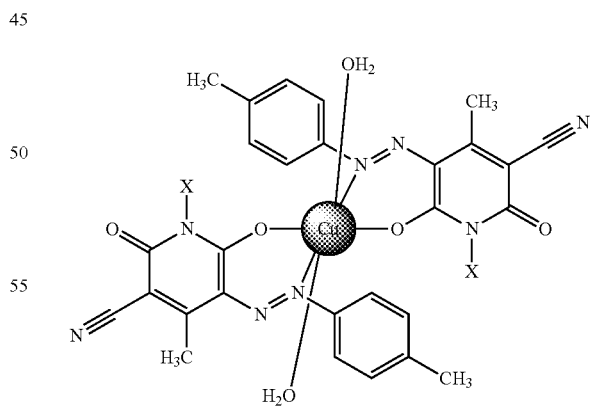

where X=a C1 to C20 hydrocarbon which is optionally substituted.

C1 to C20 hydrocarbons include both aliphatic and aromatic groups.

Aliphatic hydrocarbons may be saturated or unsaturated, cyclic, linear or branched. Examples of aliphatic hydrocarbons include methyl, ethyl, propyl, isopropyl, n-butyl, s-butyl, t-butyl, 2-butenyl, 2-butynyl, pentyl, hexyl, heptyl, octyl, nonyl, etc.

Cyclic aliphatic hydrocarbons (cycloalkyls) is a subset of hydrocarbon and includes cyclic hydrocarbon groups of from e.g. 3 to 8 carbon atoms. Examples of cycloalkyl groups include cyclopropyl, cyclobutyl, cyclopentyl, norbornyl, and the like.

Aromatic (aryl) hydrocarbons include the simple aryl group phenyl (with the chemical formula $C_6H_5$), a group derived from benzene; the tolyl group, $CH_3C_6H_4$, which is derived from toluene (methylbenzene); the xylyl group, $(CH_3)_2C_6H_3$, which is derived from xylene (dimethylbenzene); the naphthyl group, $C_{10}H_8$, which is derived from naphthalene; etc.

The C1 to C20 hydrocarbon groups which include aliphatic and aromatic groups are optionally substituted. As used herein, the term "optionally substituted" may be used interchangeably with "unsubstituted or substituted". The term "substituted" refers to the addition of one or more substituents by replacement of a carbon atom or as an attachment to a carbon atom. In some embodiments, substituents are halogen, haloalkyl, alkyl, acyl, hydroxyalkyl, hydroxy, alkoxy, haloalkoxy, aminocarbonyl oxaalkyl, carboxy, cyano, acetoxy, nitro, amino, alkylamino, dialkylamino, alkylthio, alkylsulfinyl, alkylsulfonyl, alkylsulfonylamino arylsulfonyl, arylsulfonylamino, and benzyloxy. Additional examples include: substituted alkyl, aryl, cycloalkyl, etc. wherein one or more H atoms are replaced with halogen, haloalkyl, alkyl, acyl, alkoxyalkyl, hydroxy lower alkyl, carbonyl, phenyl, heteroaryl, benzenesulfonyl, hydroxy, lower alkoxy, haloalkoxy, oxaalkyl, carboxy, alkoxycarbonyl, alkoxycarbonylamino, aminocarbonyl (also known as carboxamido), alkylaminocarbonyl, cyano, acetoxy, nitro, amino, alkylamino, dialkylamino, (alkyl)(aryl)aminoalkyl, alkylaminoalkyl (including cycloalkylaminoalkyl), dialkylaminoalkyl, dialkylaminoalkoxy, heterocyclylalkoxy, mercapto, alkylthio, sulfoxide, sulfone, sulfonylamino, alkylsulfinyl, alkylsulfonyl, acylaminoalkyl, acylaminoalkoxy, acylamino, amidino, aryl, benzyl, heterocyclyl, heterocyclylalkyl, phenoxy, benzyloxy, heteroaryloxy, hydroxyimino, alkoxyimino, oxaalkyl, aminosulfonyl, trityl, amidino, guanidino, ureido, benzyloxyphenyl, and benzyloxy. "Oxo" is also included among the substituents referred to in "optionally substituted"; it will be appreciated by persons of skill in the art that, because oxo is a divalent radical, there are circumstances in which it will not be appropriate as a substituent (e.g. on phenyl). In one embodiment, 1, 2, or 3 hydrogen atoms are replaced with a specified radical.

Cyclic and aromatic hydrocarbons may also be heterocyclic. Heterocyclic means an aliphatic or aromatic carbocycle in which from one to four carbons is replaced by a heteroatom selected such as N, O, or S. Heterocycles may also be optionally substituted. The nitrogen and sulfur heteroatoms may optionally be oxidized, and the nitrogen heteroatom may optionally be quaternized. Unless otherwise specified, a heterocycle may be non-aromatic (heteroaliphatic) or aromatic (heteroaryl). Examples of heterocycles include pyrrolidine, pyrazole, pyrrole, indole, quinoline, isoquinoline, tetrahydroisoquinoline, benzofuran, benzodioxan, benzodioxole (commonly referred to as methylenedioxyphenyl, when occurring as a substituent), tetrazole, morpholine, thiazole, pyridine, pyridazine, pyrimidine, thiophene, furan, oxazole, oxazoline, isoxazole, dioxane, tetrahydrofuran and the like. Examples of heterocyclyl residues include piperazinyl, piperidinyl, pyrazolidinyl, imidazolyl, imidazolinyl, imidazolidinyl, pyrazinyl, oxazolidinyl, isoxazolidinyl, thiazolidinyl, isothiazolyl, quinuclidinyl, isothiazolidinyl, benzimidazolyl, thiadiazolyl, benzopyranyl, benzothiazolyl, tetrahydrofuryl, tetrahydropyranyl, thienyl (also historically called thiophenyl), benzothienyl, thiamorpholinyl, oxadiazolyl, triazolyl and tetrahydroquinolinyl.

In some aspects, the C1 to C20 hydrocarbon is butyl, hexyl or benzyl.

The structures of exemplary complexes D2, D4 and D5 and their respective starting materials, A2, A4 and A5, are depicted in Scheme 1:

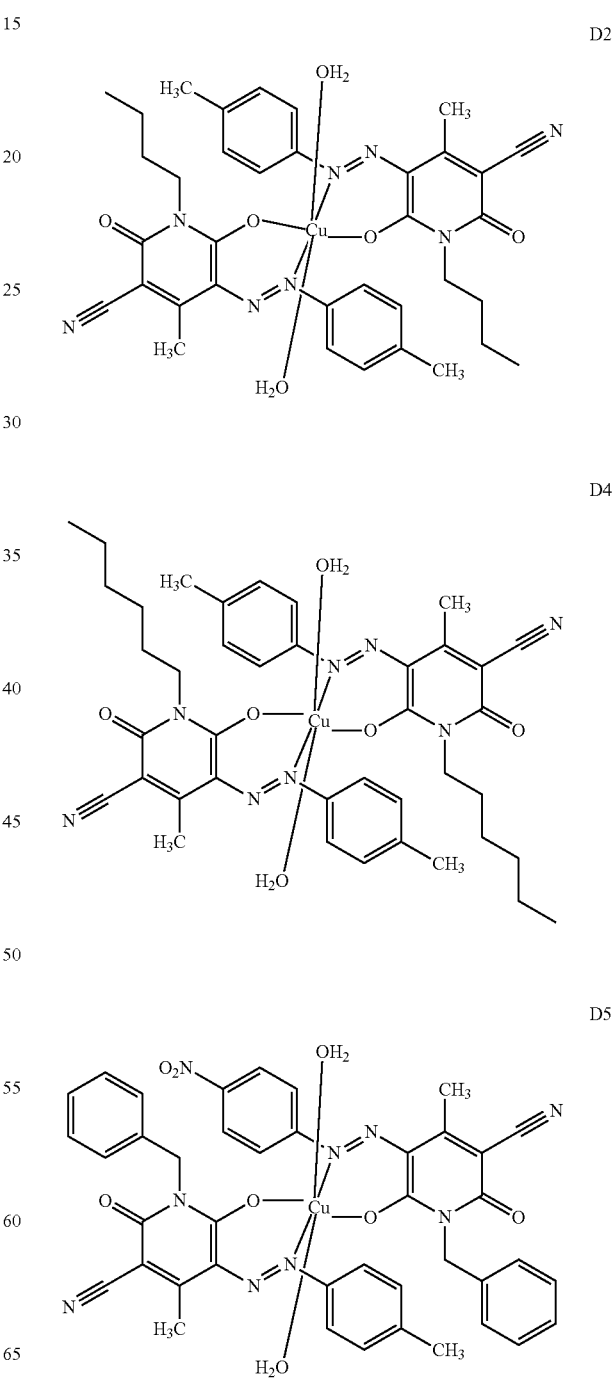

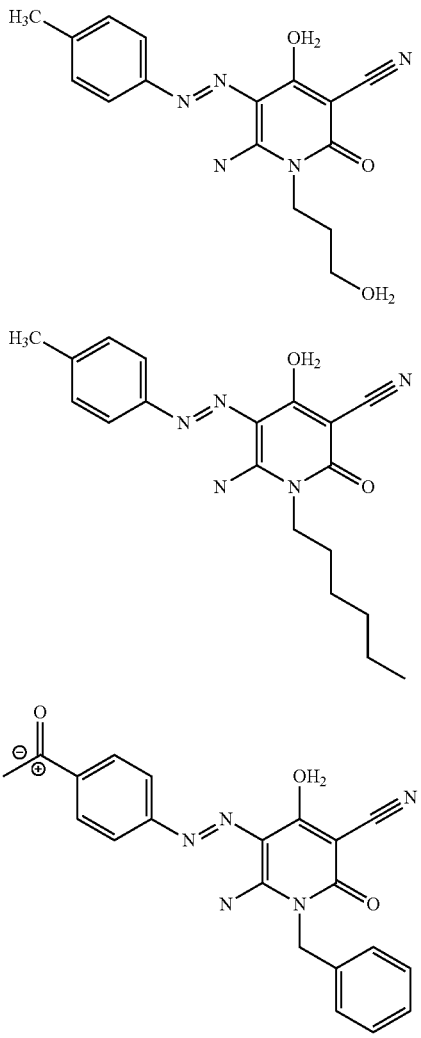

Pharmaceutical Preparations

The compounds (complexes) described herein are generally delivered (administered) as a pharmaceutical composition. Such pharmaceutical compositions generally comprise at least one of the disclosed compounds, i.e. one or more than one (a plurality) of different compounds (e.g. 2 or more such as 2, 3, 4, 5, 6, 7, 8, 9, 10 or more) may be included in a single formulation. Accordingly, the present invention encompasses such formulations/compositions. The compositions generally include one or more substantially purified compounds as described herein, and a pharmacologically suitable (physiologically compatible) carrier, which may be aqueous or oil-based. In some aspects, such compositions are prepared as liquid solutions or suspensions, or as solid forms such as tablets, pills, powders, various dosage forms, and the like. Solid forms suitable for solution in, or suspension in, liquids prior to administration are also contemplated (e.g. lyophilized forms of the compounds), as are emulsified preparations. In some aspects, the liquid formulations are aqueous or oil-based suspensions or solutions. In some aspects, the active ingredients are mixed with excipients which are pharmaceutically acceptable and compatible with the active ingredients, e.g. pharmaceutically acceptable salts. Suitable excipients include, for example, water, saline, dextrose, glycerol, ethanol and the like, or combinations thereof. In addition, the composition may contain minor amounts of auxiliary substances such as wetting or emulsifying agents, pH buffering agents, preservatives, and the like. If it is desired to administer an oral form of the composition, various thickeners, flavorings, diluents, emulsifiers, dispersing aids or binders and the like are added. The composition of the present invention may contain any such additional ingredients so as to provide the composition in a form suitable for administration. The final amount of compound in the formulations varies but is generally from about 1-99%. Still other suitable formulations for use in the present invention are found, for example in Remington's Pharmaceutical Sciences, 22nd ed. (2012; eds. Allen, Adejarem Desselle and Felton).

Some examples of materials which can serve as pharmaceutically acceptable carriers include, but are not limited to, ion exchangers, alumina, aluminum stearate, lecithin, serum proteins (such as human serum albumin), buffer substances (such as twin 80, phosphates, glycine, sorbic acid, or potassium sorbate), partial glyceride mixtures of saturated vegetable fatty acids, water, salts or electrolytes (such as protamine sulfate, disodium hydrogen phosphate, potassium hydrogen phosphate, sodium chloride, or zinc salts), colloidal silica, magnesium trisilicate, polyvinyl pyrrolidone, polyacrylates, waxes, polyethylene-polyoxypropylene-block polymers, methylcellulose, hydroxypropyl methylcellulose, wool fat, sugars such as lactose, glucose and sucrose; starches such as corn starch and potato starch; cellulose and its derivatives such as sodium carboxymethyl cellulose, ethyl cellulose and cellulose acetate; powdered tragacanth; malt; gelatin; talc; excipients such as cocoa butter and suppository waxes; oils such as peanut oil, cottonseed oil; safflower oil; sesame oil; olive oil; corn oil and soybean oil; glycols; such a propylene glycol or polyethylene glycol; esters such as ethyl oleate and ethyl laurate; agar; buffering agents such as magnesium hydroxide and aluminum hydroxide; alginic acid; pyrogen-free water; isotonic saline; Ringer's solution; ethyl alcohol, and phosphate buffer solutions, as well as other non-toxic compatible lubricants such as sodium lauryl sulfate and magnesium stearate, as well as coloring agents, releasing agents, coating agents, sweetening, flavoring and perfuming agents, preservatives and antioxidants can also be present in the composition, according to the judgment of the formulator.

"Pharmaceutically acceptable salts" refers to the relatively non-toxic, inorganic and organic acid addition salts, and base addition salts, of compounds of the present invention. These salts can be prepared in situ during the final isolation and purification of the compounds. In particular, acid addition salts can be prepared by separately reacting the purified compound in its free base form with a suitable organic or inorganic acid and isolating the salt thus formed. Exemplary acid addition salts include the hydrobromide, hydrochloride, sulfate, bisulfate, phosphate, nitrate, acetate, oxalate, valerate, oleate, palmitate, stearate, laurate, borate, benzoate, lactate, phosphate, tosylate, citrate, maleate, fumarate, succinate, tartrate, naphthylate, mesylate, glucoheptonate, lactiobionate, sulfamates, malonates, salicylates, propionates, methylene-bis-.beta.-hydroxynaphthoates, gentisates, isethionates, di-p-toluoyltartrates, methanesulfonates, ethanesulfonates, benzenesulfonates, p-toluenesulfonates, cyclohexylsulfamates and laurylsulfonate salts, and the like. See, for example S. M. Berge, et al., "Pharmaceutical Salts," J. Pharm. Sci., 66, 1-19 (1977) which is incorporated herein by reference. Base addition salts can also be prepared by separately reacting the purified compound in its acid form with a suitable organic or inorganic base and isolating the salt thus formed. Base addition salts include pharmaceutically acceptable metal and amine salts. Suitable metal salts include the sodium, potassium, calcium, barium, zinc, magnesium, and aluminum salts. The sodium and potassium salts are preferred. Suitable inorganic base addition salts are prepared from metal bases which include sodium hydride, sodium hydroxide, potassium hydroxide, calcium hydroxide, aluminum hydroxide, lithium hydroxide, magnesium hydroxide, zinc hydroxide and the like. Suitable amine base addition salts are prepared from amines which have sufficient basicity to form a stable salt, and preferably include those amines which are frequently used in medicinal chemistry because of their low toxicity and acceptability for medical use. ammonia, ethylenediamine, N-methyl-glucamine, lysine, arginine, ornithine, choline, N,N'-dibenzylethylenediamine, chloroprocaine, diethanolamine, procaine, N-benzylphenethylamine, diethylamine, piperazine, tris(hydroxymethyl)-aminomethane, tetramethylammonium hydroxide, triethylamine, dibenzylamine, ephenamine, dehydroabietylamine, N-ethylpiperidine, benzylamine, tetramethylammonium, tetraethylammonium, methylamine, dimethylamine, trimethylamine, ethylamine, basic amino acids, e.g., lysine and arginine, and dicyclohexylamine, and the like.

Administration

The terms "administer", "administering" or "administration" in reference to a dosage form of the invention refers to the act of introducing the dosage form into the system of a subject in need of treatment.

Treatment can involve administering a therapeutically effective amount of a compound described herein to a patient diagnosed with a disease and may involve administering the compound to a patient who does or does not have active symptoms. Conversely, treatment may involve administering the compositions to a patient at risk of developing a particular disease, or to a patient reporting one or more of the physiological symptoms of a disease, even though a diagnosis of this disease may not have been made.

A "therapeutically effective" amount of the compounds described herein is typically one which is sufficient to achieve the desired effect and may vary according to the nature and severity of the disease condition, and the potency of the compound. It will be appreciated that different concentrations may be employed for prophylaxis than for treatment of an active disease. A therapeutic benefit is achieved with the amelioration of one or more of the physiological symptoms associated with the underlying disorder such that an improvement is observed in the patient, notwithstanding that the patient may still be afflicted with the underlying disorder.

The compositions comprising the complexes may be administered in vivo by any suitable route including but not limited to: inoculation or injection (e.g. intravenous, intraperitoneal, intramuscular, subcutaneous, intra-aural, intraarticular, intramammary, and the like), topical application (e.g. on areas such as eyes, skin, in ears or on afflictions such as wounds and burns) and by absorption through epithelial or mucocutaneous linings (e.g., nasal, oral, vaginal, rectal, gastrointestinal mucosa, and the like). Other suitable means include but are not limited to: inhalation (e.g. as a mist or spray), orally (e.g. as a pill, capsule, liquid, etc.), intravaginally, intranasally, rectally, as eye drops, etc. In preferred embodiments, the mode of administration is by injection, e.g. intravenous or by intramammary injection or implant.

In addition, the compositions may be administered in conjunction with other treatment modalities such as substances that boost the immune system, various chemotherapeutic agents, surgery, radiation therapy, etc. When a dosage form of the invention is given in combination with one or more other active agents (in their respective dosage forms), "administration" and its variants are each understood to include concurrent and/or sequential introduction of the dosage form and the other active agents. Administration of any of the described dosage forms includes parallel administration, co-administration or sequential administration. In some situations, the therapies are administered at approximately the same time, e.g., within about a few seconds to a few hours of one another.

The subjects that are treated can be any that have or are suspected of having cancer, especially breast cancer. The subject may be of any gender or age. Generally, the subject is a mammal, typically a human, although veterinary applications of this technology are also encompassed.

The dose of a complex that is administered may be any that is suitable for the type of cancer, the particular patient, etc. Generally, the dose ranges from about 1 to about 500 mg/kg of body weight, such as about 1, 10, 20, 30, 40, 50, 60, 70, 80, 90, 100, 150, 200, 250, 300, 350, 400, 450 or 500 mg/kg, or even more, including all single digit integers between these values. In some aspects, the amount in a composition that is administered ranges from about 0.78 to 100 µg/ml.

Types of Cancers that are Treated

The compounds provided herein can be used for treating cancer in a patient, the method comprising administering to the patient a therapeutically effective amount of a compound of formula I. In some embodiments, the type of cancer can be, but is not limited to: ovarian, pancreatic, renal cell, breast, prostate, lung, hepatocellular carcinoma, glioma, leukemia, lymphoma, colorectal cancers, or sarcomas, as well as other types of cancers that are listed e.g. in issued U.S. Pat. No. 10,759,790, the complete contents of which is hereby incorporated by reference in entirely. In some aspects, the cancer is breast cancer.

Other Aspects

Also provided herein are methods of killing cancer cells by contacting the cancer cells with a compound disclosed herein. The cells may be in vitro or in vivo. In some aspects, the cancer cells are as described elsewhere herein. In further aspects, the cancer cells are breast cancer cells.

It is to be understood that this invention is not limited to particular embodiments described herein above and below, and as such may, of course, vary. It is also to be understood that the terminology used herein is for the purpose of describing particular embodiments only and is not intended to be limiting.

Where a range of values is provided, it is understood that each intervening value between the upper and lower limit of that range (to a tenth of the unit of the lower limit) is included in the range and encompassed within the invention, unless the context or description clearly dictates otherwise. In addition, smaller ranges between any two values in the range are encompassed, unless the context or description clearly indicates otherwise.

Unless defined otherwise, all technical and scientific terms used herein have the same meaning as commonly understood by one of ordinary skill in the art to which this invention belongs. Representative illustrative methods and materials are herein described; methods and materials similar or equivalent to those described herein can also be used in the practice or testing of the present invention.

All publications and patents cited in this specification are herein incorporated by reference as if each individual publication or patent were specifically and individually indicated to be incorporated by reference, and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual dates of public availability and may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as support for the recitation in the claims of such exclusive terminology as "solely," "only" and the like in connection with the recitation of claim elements, or use of a "negative" limitations, such as "wherein [a particular feature or element] is absent", or "except for [a particular feature or element]", or "wherein [a particular feature or element] is not present (included, etc.) . . . ".

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

Example

This example describes the synthesis and characterization of heterocyclic diazenyl pyridinone copper(II)-based complexes as potential pharmacological antitumor agents. Their potential to act as anti-cancer chemotherapeutic agents, as well as their impact on the cell death pathway, was investigated human breast cancer cell lines.

Synthesis

The copper(II)-complexes (D2, D4, D5) were synthesized by the following general method: (2 mmol) of each ligand (A2, 0.376 g), (A4, 0.292 g), (A5, 0.557 g) was dissolved in 20 ml of hot ethanol. Then, a solution of the $CuCl_2$ salt (0.171 g, 1 mmol) was added dropwise with constant stirring, followed by adding few drops of an aqueous solution of sodium hydroxide NaOH (0.5 M) to adjust the pH to 8. The mixture was gently refluxed for 2 h at 50° C. Under reduced pressure, the volume was condensed to half of the initial amount. Then, the solid precipitation of Cu(II) complexes that separated out upon slow cooling at room temperature, was filtered off, washed with cold ethanol (10 mL), followed by diethyl ether (10 mL), and dried under vacuum over anhydrous $CaCl_2$. The crude products of Cu(II) complexes were recrystallized from DMSO solvent at room temperature.

Result and Discussion

FT-IR Spectra

The IR spectra of the free ligands of (A2, A4, A5) and the respective Cu(II)-complexes (D2, D4, D5) were hold in a solid-state to determine the coordination mode of the ligands and complexes, respectively. The stretching vibration of the free ligands ν(—OH) at 3434-3460 cm−1 was not observed in the IR spectra of the complexes, suggesting the deprotonation of the hydroxyl group and formation of M-O bonds [22,23]. However, bands between 1617-1626 cm−1 in the free ligands are assigned to ν(—CN), and they are shifted to lower wavenumbers in the complexes due to the coordination of the nitrogen atom of the diazenyl to the metal ion [24,25]. The strong band assigned to ν(N=N) at 1511 cm−1 in the spectra of free ligands is shifted to higher frequencies in all complexes at 1544 cm−1, indicating its involvement in the coordination of the ligands to the metal ions [26,27]. The bands assignable to ν(C≡N) at 2250 cm−1 are shifted to lower wavenumber 2216 cm−1 in the complex.

Moreover, in the far IR spectra of all complexes, there are new bands observed in the region of 580-400 $cm^{-1}$, which are absent in the spectrum of the free ligands. The band observed between 464-495 cm−1 represents the ν(M-N) bond. Also, the bands at 530 and 572 cm−1 represent the ν(M-O) band, which gives conclusive evidence concerning the bonding of nitrogen and oxygen to the metal ions [28]. Therefore, the IR spectra indicate that the ligands coordinate through the deprotonated O and azo N.

EPR Spectra

Figure 4C:
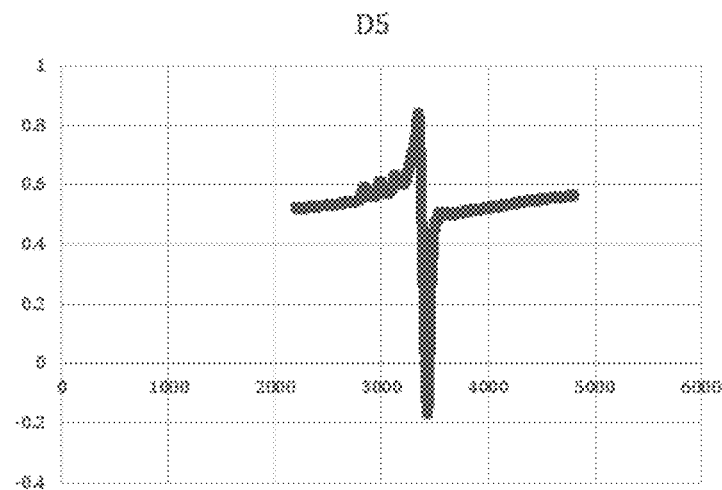

The EPR spectra of the (D2, D4, D5) complexes were recorded in DMF solution at LNT (77K). All complexes exhibited a typical four-line spectral pattern, assignable to monomeric copper (II) complexes [29]. From the observed g values, $g_{prep} < g_{||} < 2$, it is apparent that the unpaired electron lies predominantly in $d_{x2-y2}$ orbital giving $^2B_1g$ as the ground state [30]. Also, indicated is the ionic nature of the metal-ligand bond in the complex, and the higher g ii values indicate a slight distortion from regular planarity [31,32] (See FIG. 4).

Single-Crystal X-Ray Structure Determination

The crystal structure of Cu-complex (D4) using the ligand of (A4), (E)-1-hexyl-4-methyl-6-(λ1-oxidaneyl)-2-oxo-5-(p-tolyldiazenyl)-1,2-dihydropyridine-3-carbonitrile) crystallized in monoclinic space group P21/c (14) is described in Table 1.

TABLE 1

Crystallographic data and structure refinement details of D4 complex.

| Complex code | D4 |
|---|---|
| Formula | $C_{40}H_{46}CuN_8O_4$ |
| T/K | 120 |
| M/g · $mol^{-1}$ | 766.4 |
| Crystal system | Monoclinic |
| Space group | P2$_1$/c (14) |
| a/Å | 9.5534(2) |
| b/Å | 12.9787(3) |
| c/Å | 15.3298(4) |
| α/° | 90 |
| β/° | 96.718(1) |
| γ/° | 90 |
| V/Å$^3$ | 1887.70(8) |
| Z | 2 |
| $\rho_{calc}$/g · $cm^{-3}$ | 1.348 |
| μ/$mm^{-1}$ | 1.239 |
| Reflections | 22695 |
| $R_{int}$ | 0.0459 |
| Parameters | 244 |
| $R_1$ [I > 4σI][a] | 0.0392 |
| wR2[all data] | 0.1138 |
| S[c] | 1.043 |
| Max./min./e · Å$^3$ | 0.690/−0.520 |

Figure 5:
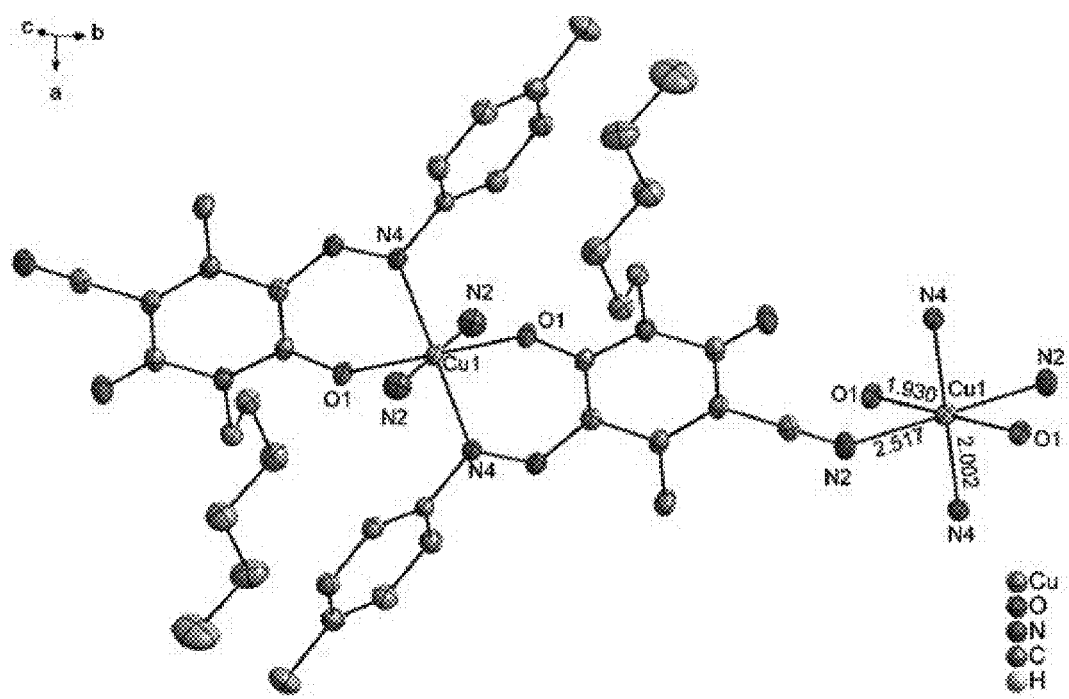
FIG. 5. Perspective view of the molecular structure along [111] reflecting the coordination of the ligands to the central Cu atom of the generic compound.

In this structure, the Cu-atom is occupying the position at the center of symmetry (Ī) and coordinated by four ligands. FIG. 5 shows a perspective view of the complex D4 along [111] reflecting the coordination environment of the Cu atom. Two of the ligands are bidentate to the Cu atom through the nitrogen atom of the diazenyl group (N3-N4) and oxygen (O1) atom of the oxidaneyl-group forming the equatorial plane of the octahedral coordination of Cu. The interatomic distances are d(Cu—N4)=2.002(2) Å and d(Cu—O1)=1.930(1) Å, respectively, which are close to the distances reported for azo-azomethine $Cu[C_{22}H_2ON_3O]_2$ and [Cu(agen) complexes] [33,34].

Figure 6:
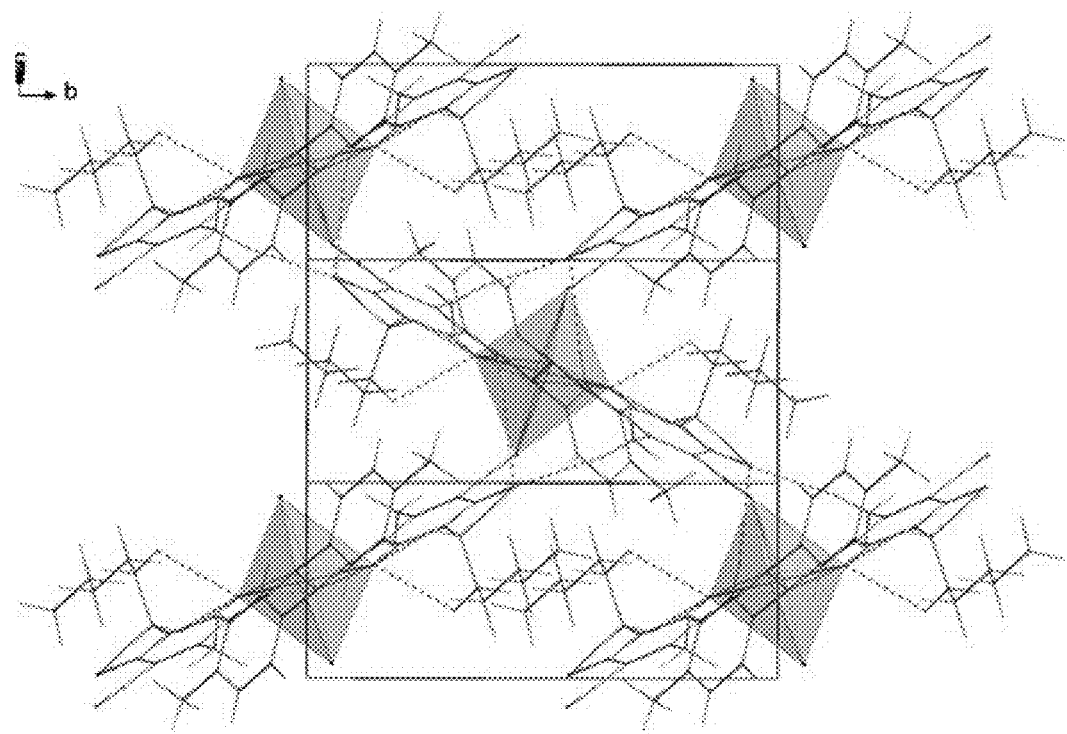
FIG. 6. Packing diagram of the generic compound. Coordination of the central atoms are displayed with octahedra, and intra- and intermolecular H-bonding is depicted by dashed lines.

The other two ligands coordinate the Cu atom through the nitrogen atom of the nitrile group, completing the distorted octahedral coordination of the Cu-atom. We assume that the latter two ligands have pure dative bonding nature to the Cu-center as the d(Cu . . . N2)=2.517(2) Å, which is much longer compared to Cu—N4 distance. The bond angles of $CuO_2N_4$ octahedron are ∠O—Cu—N=87.81(6)° and 92.19 (6)°; cis ∠N—Cu—N=82.08(6)°, 97.92(6)° and all trans angles 180°. The dihedral angle defined by the N4-N3-C12 plane of the ligand and equatorial plane of the $CuO_2N4$-octahedron is 35.1(2)°. The p-tolyl group is at 40.18(13)° to the main ligand plane. The 3D supramolecular features of the structure established through AB stacking of molecules along [101] with the help of dative N→Cu interaction and intermolecular H-bonding FIG. 6. In this structure, there are both intra-and intermolecular hydrogen bonding. The intramolecular hydrogen bonding is observed between the carbon atoms of the hexyl-group and oxygen atoms with C—H . . . O ranging between 2.348(2) Å—2.619(1) Å. Intermolecular H-bonding is realized only through the O2 atom with the carbon atoms of methyl-group of the azo-azomethine ring and p-tolyl group with C—H . . . O of 2.599(1) Å and 2.724(1) Å, respectively (see FIG. 6).

Data Analysis of Cytotoxic Activity Test

The samples were tested against the human primary hepatocytes THLE-2 (normal cell line, ATCC). Cells were maintained at sub-confluency at 37° C. in humidified air containing 5% $CO_2$. The samples' concentrations ranged between (100 to 0.78 µg/ml) and the MTT assay was used to assess cell death.

Table 2 shows the effect of complexes (D2, D4, D5) on the normal cell line. The results showed that the complexes were safe even at the high concentration of 100 ppm. This result proved that the tumor-specificity for complexes D4 is largely safe for use with normal human cells.

Figure 7A:
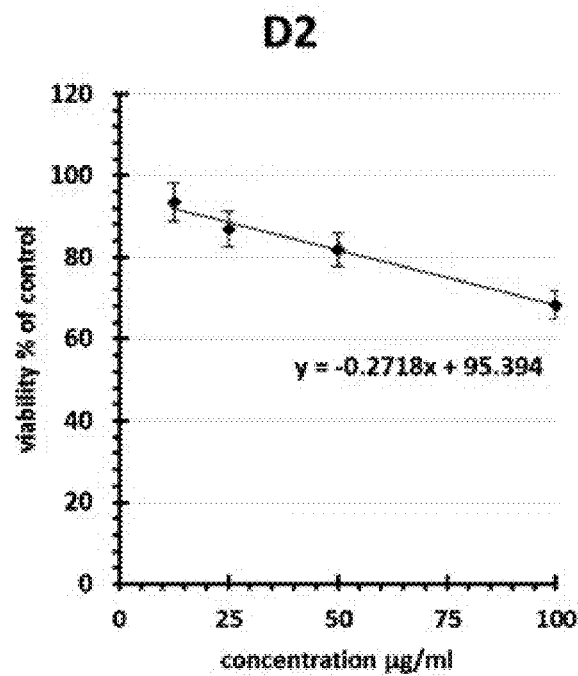
FIG. 7A-C. Anti-tumor efficiency and toxicity. A, D2; B, D4; C, D5.
Figure 7B:
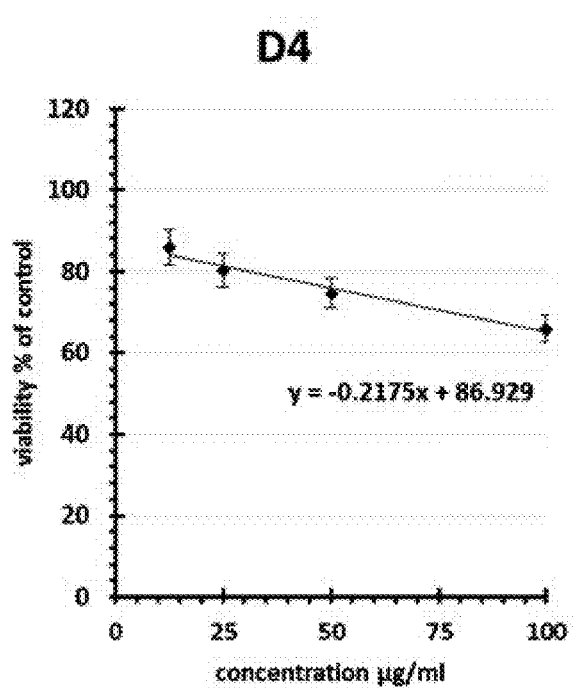
Figure 7C:
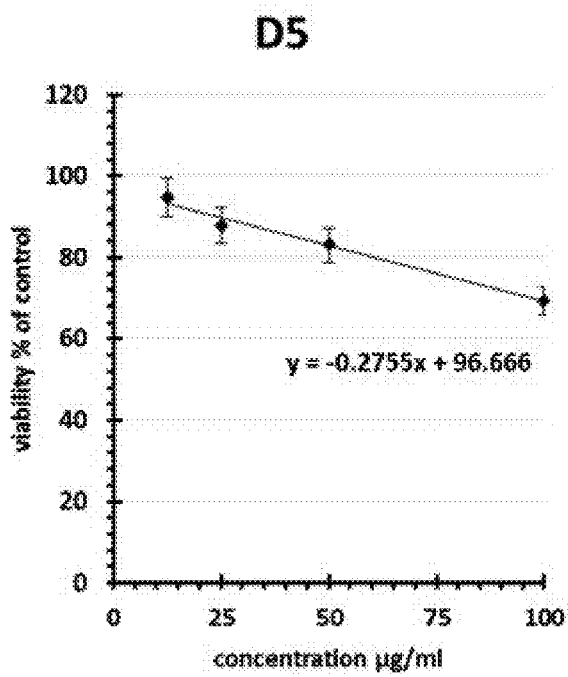

Significantly, the results showed a high anti-tumor efficacy for all tested drugs in addition to the non-cytotoxic effect, with an $IC_{50}$>100 µg/ml (FIG. 7).

TABLE 2

The effect of D complexes on the THLE-2 human normal cells correlated to the cytotoxicity effects of D complexes against the MCF-7 human breast adenocarcinoma cells

| complex Code | MCF-7 human breast adenocarcinoma cells | | THLE-2 human normal hepatocytes | |
|---|---|---|---|---|
| | Mean $IC_{50}$ (µg/mL) | ±SE | Mean $IC_{50}$ (µg/mL) | ±SE |
| D2 | 3.41 | 0.23 | 167.00 | 11.52 |
| D4 | 83.72 | 5.53 | 169.76 | 11.71 |
| D5 | 7.60 | 0.50 | 169.42 | 12.69 |

$LC_{50}$: Lethal concentration of the sample which causes the death of 50% of cells in 48 hrs.
The calculated $IC_{50}$ is represented [in f, µg/ml, mean ± SE]

REFERENCES

[1] Manjunath, M., Kulkarni, A. D., Bagihalli, G. B., Malladi, S., and Patil, S. A., *J. Mol. Struct.*, 2017, 1127, 314.

[2] Hranjec, M., Starčević, K., Pavelić, S. K., Lučin, P., Pavelić, K., and Karminski Zamola, G., *Eur J Med Chem.*, 2011, 11, 5200.

[3] Liu, S., Wei, W., Shi, K., Cao, X., Zhou, M., and Liu, Z., *J. Med. Chem.*, 2010, 202, 991.

[4] Badea, M., Calu, L., Chifiriuc, M. C., Bleotu, C., Marin, A., Ion, S., Ioniță, G., Stanică, N., Măruțescu, L., Lazăr, V., Marinescu, D., and Olar, R. J., *J. Therm. Anal. Calorim.*, 2014, 118, 1145.

[5] Chow, M. J., Babak, M. V., Wong, D. Y. Q., Pastorin, G., Gaiddon, C., and Ang, W. H., *Mol. Pharmaceutics*, 2016, 13, 2543.

[6] Hartinger, C. G., Zorbas-Seifried, S., Jakupec, M. A., Kynast, B., Zorbas, H., and Keppler, B. K., *J. Inorg. Biochem.*, 2006, 100, 891.

[7] Yan, Y. K., Melchart, M., Habtemariam, A., and Sadler, P. J., *Chem. CommuN.*, 2005, 38, 4764.

[8] National Cancer Institute. SEER: Surveillance, Epidemiology and End Results Program. 2005 Available from the website at seer.cancer.gov.

[9] Erikson, C., Salsberg, E., Forte, G., Bruinooge, S., and Goldstein, M., *J Oncol Prac.*, 2007, 3, 79.

[10] Munoz, N., Bosch, F. X., de Sanjose, S., and Shah, K. V., *Mutat. Res.*, 1994, 305, 293.

[11] Zhang, C. X., and Lippard, S. J., *Curr. Opin. Chem. Biol.*, 2003, 7, 481.

[12] Johnstone, T. C., Park, G. Y., and Lippard, S. J., *Anticancer Research*, 2014, 34, 471.

[13] Galaris, D., and Evangelou, A., *Crit. Rev. Oncol. Hematol.*, 2002, 42, 93.

[14] Wolohan, P., Yoo, J., Welch, M. J., and Reichert, D. E., *J. Med. Chem.*, 2005, 48, 5561.

[15] Beckford, F. A., Shaloski, M. Jr., Leblanc, G., and Thessing, J., Lewis-Alleyne, L. C, Holder, A. A, Li, L., and Seeram, N. P., *Dalton Trans.*, 2009, 48, 10757.

[16] Tarasconi, P., Capacchi, S., Pelosi, G., Cornia, M., Albertini, R., Bonati, A., Dall'Aglio, P. P., and Lunghi, P., *Bioorg Med Chem.*, 2000, 8, 157.

[17] West, D. X., Swearingen, J. K., Valdes-Martinez, J., Hernandez-Ortega, S., El-Sawaf, A. K., Van Meurs, F., Castineiras, A., Garcia, I., and Bermejo, E., *Polyhedron.*, 1999, 18, 2919.

[18] Zhang, N., Fan, Y., Zhang, Z., Zuo, J., Zhang, P., Wang, Q., Liu, S., and Bi, C., *Inorg. Chem. Commun.*, 2012, 22, 68.

[19] Beckford, F. A., Shaloski, M. Jr., Leblanc, G., and Thessing, J., Lewis-Alleyne, L. C, Holder, A. A, Li, L., and Seeram, N. P., *Dalton Trans.*, 2009, 48, 10757.

[20] Tarasconi, P., Capacchi, S., Pelosi, G., Cornia, M., Albertini, R., Bonati, A., Dall'Aglio, P. P., and Lunghi, P., *Bioorg Med Chem.*, 2000, 8, 157.

[21] West, D. X., Swearingen, J. K., Valdes-Martinez, J., Hernandez-Ortega, S., El-Sawaf, A. K., Van Meurs, F., Castineiras, A., Garcia, I., and Bermejo, E., *Polyhedron.*, 1999, 18, 2919.

[22] Bansal, S. K., Tikku, S., and Sindhu, R. S., *J. Ind. Chem. Soc.*, 1991, 86, 566.

[23] Mostafa, S. I., *Polyhedron*, 1992, 11, 2997.

[24] Larabi, L., Harek, Y., Reguig, A., and Mostafa, M. M., *J. Serb. Chem. Soc.*, 2003, 68, 85.

[25] Dehghanpour, S., Bouslimani, N., Welter, R., and Mojahed, F., *polyhedron*, 1996, 15, 1283.

[26] Mohamed, G. G., El-Gamel, N., E. A., and Teixidor, F., *Polyhyderon*, 2001, 20, 2696.

[27] Mohamed, G. G., Zayed, M. A., and El-Gamel, N. E. A., *Spectrochim. Acta A*, 2002, 58, 3167.

[28] Zaki, Z. M., Haggag, S. S., and Soayed, A. A., *Spectrosc. Lett.*, 1998, 31, 757.

[29] Bertini, I., Ganti, G., and Grassi, R., *Inorg, Chem.*, 1980, 19, 2189.

[30] Sakaguchi, U., and Addison, A. W., *J. Chem. Soc. Dalton Trans.*, 1979, 600.

[31] Yokoi, H., and Addison, A. W., *Inorg, Chem.*, 1977, 16, 1341.

[32] Annaraj, J. P., Ponvel, K. M., and Athappan, P., *Trans. Met. Chem.*, 2004, 29, 722.

[33] Eren Tugba, Kose, M., Kurtoglu, N., Ceyhan, G., McKee, V., and Kurtoglu, M., *Inorg, Chem. Acta.*, 2015, 430, 268.

[34] Ozkan, G., Kose, M., Zengin, H., McKee, V., and Kurtoglu, M., *Spectrochim. Acta., Part A*, 2015, 150, 966.

While the invention has been described in terms of its several exemplary embodiments, those skilled in the art will recognize that the invention can be practiced with modification within the spirit and scope of the appended claims. Accordingly, the present invention should not be limited to the embodiments as described above, but should further include all modifications and equivalents thereof within the spirit and scope of the description provided herein.

We claim:
1. A compound of Formula I:

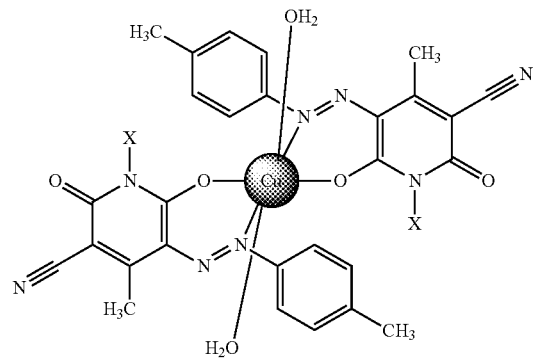

Formula I wherein X=butyl, hexyl or benzyl.

2. A composition comprising a compound of Formula I:

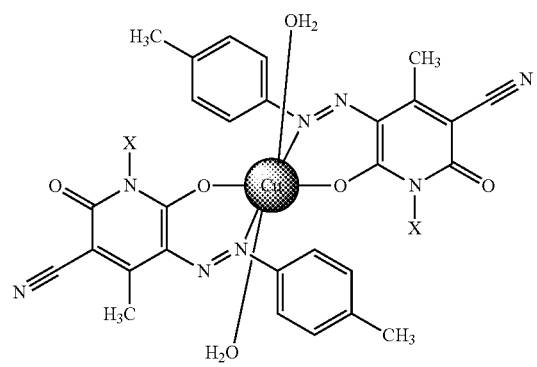

Formula I wherein X=butyl, hexyl or benzyl, and
a pharmaceutically acceptable carrier.

3. The compound of claim 1 wherein X is butyl.
4. The compound of claim 1 wherein X is hexyl.
5. The compound of claim 1 wherein X is benzyl.

* * * * *